US011845351B2

United States Patent
Gurusamy et al.

(10) Patent No.: US 11,845,351 B2
(45) Date of Patent: Dec. 19, 2023

(54) SYSTEM AND METHOD FOR A MISSION-BASED BATTERY STATUS DISPLAY FOR ELECTRIC VEHICLES

(71) Applicant: HONEYWELL INTERNATIONAL INC., Morris Plains, NJ (US)

(72) Inventors: Saravanakumar Gurusamy, Bangalore (IN); Madhava Gadicheria, Bangalore (IN); Jayasenthilnathan Balasubramanian, Phoenix, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 603 days.

(21) Appl. No.: 17/009,466

(22) Filed: Sep. 1, 2020

(65) Prior Publication Data

US 2022/0063431 A1 Mar. 3, 2022

(30) Foreign Application Priority Data

Jul. 7, 2020 (IN) .............................. 202011028817

(51) Int. Cl.
  *B60L 53/60* (2019.01)
  *H02J 7/00* (2006.01)
  *B60L 58/12* (2019.01)

(52) U.S. Cl.
  CPC .............. *B60L 53/60* (2019.02); *B60L 58/12* (2019.02); *H02J 7/0013* (2013.01);
  (Continued)

(58) Field of Classification Search
  CPC ...... B60L 53/60; B60L 58/12; B60L 2200/10; B60L 2270/00; B60L 2240/80;
  (Continued)

(56) References Cited

U.S. PATENT DOCUMENTS 4,931,738 A * 6/1990 MacIntyre ......... G01R 31/3646
  324/435
5,352,982 A * 10/1994 Nakazawa ................ B60L 3/12
  340/636.15
(Continued)

FOREIGN PATENT DOCUMENTS

CN    106208249 A    12/2016
CN    106786836 A     5/2017
(Continued)

OTHER PUBLICATIONS

JP 2019163992 A with English translation (Year: 2019).*
(Continued)

*Primary Examiner* — Calvin Cheung
(74) *Attorney, Agent, or Firm* — Lorenz & Kopf LLP (57) ABSTRACT

Systems and methods are provided for displaying operating data for a re-chargeable battery for an electric vehicle. The system comprises a re-chargeable battery for powering components of an electrical vehicle, a sensor that detects a present level of charge in the battery and a display. The display receives the present level of charge of the battery from the monitor and displays the present level of charge in the battery, a required level of endurance for the battery that is based on a planned operational parameter for the vehicle, a minimum level of charge in the battery that meets the required level of endurance, and an amount of time needed to re-charge the battery to achieve the minimum level of charge.

18 Claims, 8 Drawing Sheets

(52) U.S. Cl.
CPC ......... *H02J 7/0048* (2020.01); *B60L 2200/10* (2013.01); *B60L 2270/00* (2013.01)

(58) Field of Classification Search
CPC ............. B60L 2250/10; B60L 2250/16; B60L 2260/54; B60L 58/13; B60L 58/16; B60L 58/24; H02J 7/0013; H02J 7/0048; Y02T 10/70; Y02T 10/7072; Y02T 90/12
See application file for complete search history.

(56) References Cited

U.S. PATENT DOCUMENTS

| | | | | |
|---|---|---|---|---|
| 6,331,761 | B1* | 12/2001 | Kumar | H02J 7/0013 320/132 |
| 8,179,245 | B2 | 5/2012 | Chander et al. | |
| 9,213,670 | B2 | 12/2015 | Edgren | |
| 9,457,682 | B2 | 10/2016 | Twarog et al. | |
| 9,634,504 | B2 | 4/2017 | Wu et al. | |
| 10,471,844 | B2 | 11/2019 | Lee | |
| 10,538,161 | B2 | 1/2020 | You et al. | |
| 10,551,205 | B2 | 2/2020 | Gaspard-Boulinc et al. | |
| 2003/0052650 | A1* | 3/2003 | Gunji | B60L 58/15 320/155 |
| 2009/0030568 | A1* | 1/2009 | Amano | G01C 21/26 903/930 |
| 2011/0029265 | A1* | 2/2011 | Martens | G01R 31/392 702/63 |
| 2011/0071707 | A1* | 3/2011 | Crumm | B64C 39/024 701/3 |
| 2011/0225105 | A1 | 9/2011 | Scholer et al. | |
| 2013/0006677 | A1 | 1/2013 | Anglin et al. | |
| 2013/0335029 | A1* | 12/2013 | Cooper | G01R 31/371 324/435 |
| 2014/0214321 | A1 | 7/2014 | Kawamata et al. | |
| 2015/0130283 | A1* | 5/2015 | Zilbershlag | H01M 10/4207 307/66 |
| 2015/0353192 | A1* | 12/2015 | Morrison | B64D 31/06 244/17.23 |
| 2016/0036259 | A1* | 2/2016 | Cheatham, III | H02J 7/00036 320/103 |
| 2016/0236582 | A1* | 8/2016 | Wang | B64F 1/0297 |
| 2017/0028866 | A1* | 2/2017 | Miller | B60W 20/12 |
| 2017/0210241 | A1* | 7/2017 | Li | B64C 39/024 |
| 2018/0068567 | A1* | 3/2018 | Gong | G08G 5/0039 |
| 2018/0166911 | A1* | 6/2018 | Ionescu | G01R 31/382 |
| 2018/0188332 | A1* | 7/2018 | Newman | B60L 53/665 |
| 2019/0033385 | A1* | 1/2019 | Karner | G01R 31/374 |
| 2019/0143832 | A1 | 5/2019 | Birek et al. | |
| 2020/0361338 | A1* | 11/2020 | James | H02J 7/34 |
| 2021/0384531 | A1* | 12/2021 | Taruya | H01M 8/0494 |

FOREIGN PATENT DOCUMENTS

| | | | | |
|---|---|---|---|---|
| CN | 108216623 | A | 6/2018 | |
| CN | 108233444 | A | 6/2018 | |
| CN | 109032177 | A | 12/2018 | |
| EP | 2230146 | A2 | 9/2010 | |
| JP | 2019163992 | A | 9/2019 | |
| WO | 2010033517 | A2 | 3/2010 | |
| WO | WO-2015047868 | A1 * | 4/2015 | ....... G01R 19/16542 |

OTHER PUBLICATIONS

JP 2013147123 A with English translation (Year: 2013).*
EP-2456637-B1 with English translation (Year: 2016).*
European search opinion for EP 21181296 filed Dec. 10, 2021 (Year: 2021).*
KR 19990053655 A with English translation (Year: 1999).*
Ashkrof, Peyman, et al. "Analysis of the Effect of Charging Needs on Battery Electric Vehicle Drivers' Route Choice Behaviour: A Case Study in the Netherlands," Transportation Research Part D 78 (2020) 102206, https://doi.org/10.1016/j.trd.2019.102206.

* cited by examiner

SYSTEM AND METHOD FOR A MISSION-BASED BATTERY STATUS DISPLAY FOR ELECTRIC VEHICLES

CROSS-REFERENCE TO RELATED APPLICATION

This application claims priority from Indian Provisional Patent Application No. 202011028817, titled "SYSTEM AND METHOD FOR A MISSION-BASED BATTERY STATUS DISPLAY FOR ELECTRIC VEHICLES" that was filed Jul. 7, 2020.

TECHNICAL FIELD

The present invention generally relates to operations of electric vehicles, and more particularly relates to a system and method for a mission-based battery status display for electric vehicles.

BACKGROUND

As electric powered vehicles become more common, is critical for both operators and maintenance personnel of those vehicles to receive accurate information regarding the operational status of the batteries which power the vehicles. The operational status may include such information as: the current charge level of the batteries: the range of the vehicle at the current charge levels; the time required to charge the batteries; etc. Hence, there is a need for a system and method for a mission-based battery status display for electric vehicles.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

A system is provided for displaying operating data for a re-chargeable battery for an electric vehicle. The system comprises: a re-chargeable battery for powering components of the electric vehicle; a sensor for the battery that detects a present level of charge in the battery; and a display that receives the present level of charge of the battery from the sensor, and shows, the present level of charge in the battery, a required endurance level for the battery, where the required level of endurance is based on a planned operational parameter for the vehicle, a minimum charge level in the battery that meets the required endurance level of the battery, and an amount of re-charge time for the battery to achieve the minimum charge level in the battery.

A system is provided for displaying operating data for a re-chargeable multi-battery pack for an electric vehicle. The system comprises: a re-chargeable multi-battery pack for powering components of the electric vehicle, where the multi-battery pack comprises a plurality of individual re-chargeable batteries; a sensor that detects a present level of charge in each battery; and a display that receives the present level of charge of each battery from the sensor, and shows, the present level of charge in each battery, a required endurance level for the multi-battery pack, where the required level of endurance is based on a planned operational parameter for the vehicle, a minimum total charge level for the multi-battery pack that meets the required endurance level of the battery, and an amount of re-charge time for each battery to achieve the minimum total charge level for the multi-battery pack.

A method is provided for displaying operating data for a re-chargeable battery for an electric vehicle. The method comprises: detecting a present level of charge in a re-chargeable battery with a sensor, where the battery powers components of the vehicle; receiving the present level of charge of the battery from the sensor with a display; and showing on the display, the present level of charge in the battery, a required endurance level for the battery, where the required level of endurance is based on a planned operational parameter for the vehicle, a minimum charge level in the battery that meets the required endurance level of the battery, and an amount of re-charge time for the battery to achieve the minimum charge level in the battery.

Furthermore, other desirable features and characteristics of the method and system will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Systems and methods for displaying operating data for a re-chargeable battery for an electric vehicle have been developed. The system comprises a re-chargeable battery for powering components of an electrical vehicle, a sensor that detects a present level of charge in the battery and a display. The display receives the present level of charge of the battery from the monitor and displays the present level of charge in the battery, a required level of endurance for the battery that is based on a planned operational parameter for the vehicle, a minimum level of charge in the battery that meets the required level of endurance, and an amount of time needed to re-charge the battery to achieve the minimum level of charge.

Figure 1:
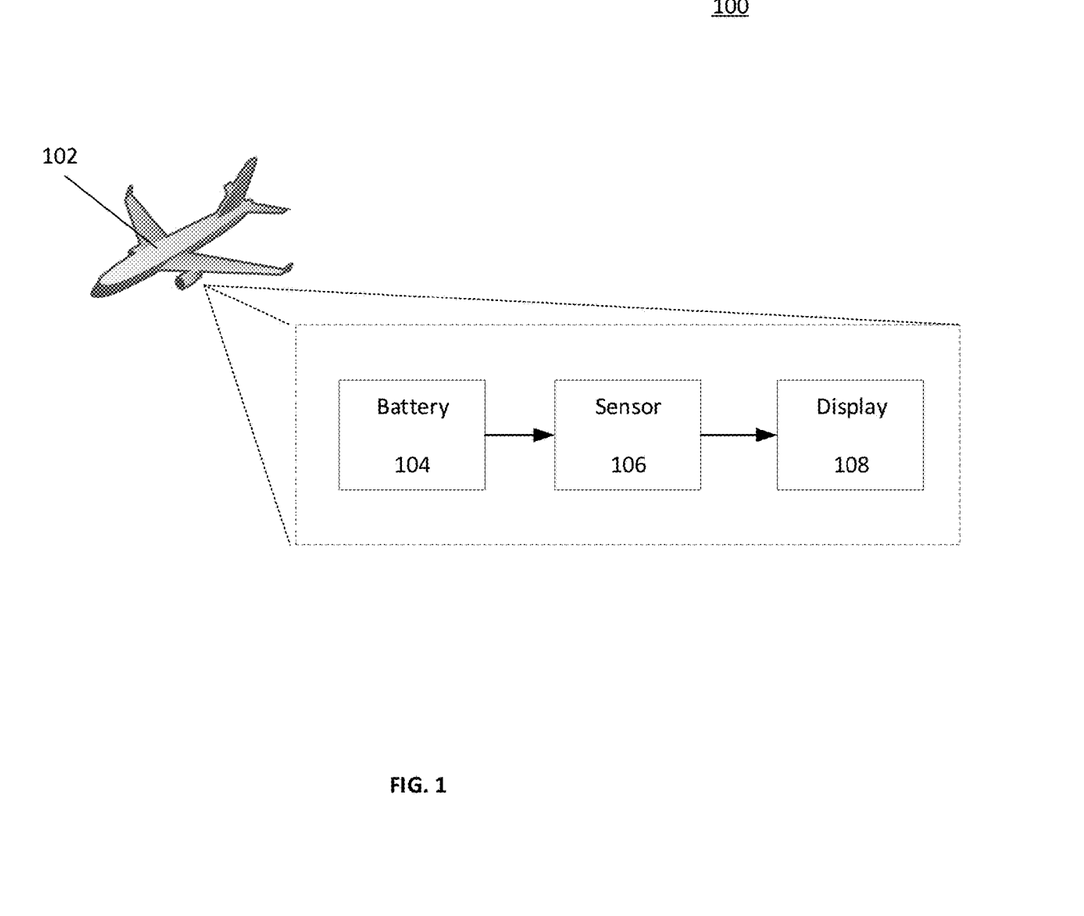
FIG. 1 shows a diagram for a rechargeable battery system for an aircraft in accordance with one embodiment.

Turning now to FIG. 1, a diagram 100 is shown for rechargeable battery system for an aircraft 102 in accordance with one embodiment. The aircraft 102 includes a battery 104 that provides electrical power. The status of the battery along with various operational data of the battery 104 is monitored by a sensor 106. This operational data that is collected by the sensor 106 is then shown to the aircrew by a display 108. It should be understood that while this example shows an aircraft, other types of vehicles that utilize batteries for providing electrical power could use this system and method. For example, the system and method as shown could apply to a ground-based electric vehicle as well as an unmanned aerial vehicle (UAV). Additionally, other embodiments could be applied to "hybrid" vehicles that have a combination electrical power source and internal combustion power source.

Figure 2:
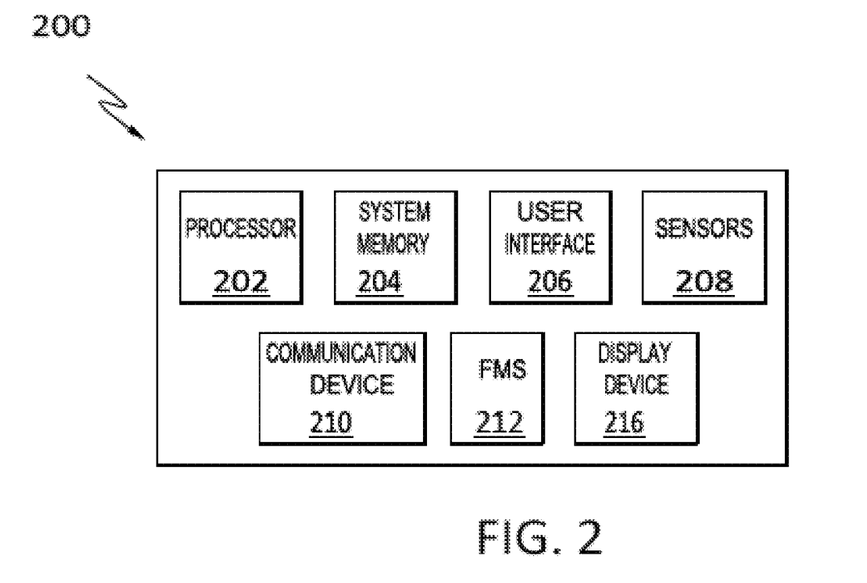
FIG. 2 shows a functional block diagram of a computing system for an aircraft in accordance with one embodiment.

FIG. 2 is a functional block diagram of a computing device 200, in accordance with the disclosed embodiments. It should be noted that the sensors 208 and the display 216 can be implemented with the sensor 106 and display 108 depicted in FIG. 1. In this regard, the computing device 200 shows certain elements and components of the aircraft 102 in more detail.

The computing device 200 generally includes, without limitation: a processor 202; system memory 204; a user interface 206; a plurality of sensors 208; a communication device 210; a flight management system (FMS) 212; and a display device 216. These elements and features of the computing device 200 may be operatively associated with one another, coupled to one another, or otherwise configured to cooperate with one another as needed to support the desired functionality. For ease of illustration and clarity, the various physical, electrical, and logical couplings and interconnections for these elements and features are not depicted in FIG. 2. Moreover, it should be appreciated that embodiments of the computing device 200 will include other elements, modules, and features that cooperate to support the desired functionality. For simplicity, FIG. 2 only depicts certain elements that are described in more detail below.

The processor 202 may be implemented or performed with one or more general purpose processors, a content addressable memory, a digital signal processor, an application specific integrated circuit, a field programmable gate array, any suitable programmable logic device, discrete gate or transistor logic, discrete hardware components, or any combination designed to perform the functions described here. In particular, the processor 202 may be realized as one or more microprocessors, controllers, microcontrollers, or state machines. Moreover, the processor 202 may be implemented as a combination of computing devices, e.g., a combination of digital signal processors and microprocessors, a plurality of microprocessors, one or more microprocessors in conjunction with a digital signal processor core, or any other such configuration.

The processor 202 is communicatively coupled to the system memory 204. The system memory 204 is configured to store any obtained or generated data associated with generating alerts to redirect user attention from the computing device 200 to a critical or high-priority flight situation. The system memory 204 may be realized using any number of devices, components, or modules, as appropriate to the embodiment. Moreover, the computing device 200 could include system memory 204 integrated therein and/or a system memory 204 operatively coupled thereto, as appropriate to the particular embodiment. In practice, the system memory 204 could be realized as RAM memory, flash memory, EPROM memory, EEPROM memory, registers, a hard disk, a removable disk, or any other form of storage medium known in the art. In certain embodiments, the system memory 204 includes a hard disk, which may also be used to support functions of the computing device 200. The system memory 204 can be coupled to the processor 202 such that the processor 202 can read information from, and write information to, the system memory 204. In the alternative, the system memory 204 may be integral to the processor 202. As an example, the processor 202 and the system memory 204 may reside in a suitably designed application-specific integrated circuit (ASIC).

The user interface 206 may include or cooperate with various features to allow a user to interact with the computing device 200. Accordingly, the user interface 206 may include various human-to-machine interfaces, e.g., a keypad, keys, a keyboard, buttons, switches, knobs, a touchpad, a joystick, a pointing device, a virtual writing tablet, a touch screen, a microphone, or any device, component, or function that enables the user to select options, input information, or otherwise control the operation of the computing device 200. For example, the user interface 206 could be manipulated by an operator to provide flight data parameters during the operation of electronic flight bag (EFB) applications, as described herein.

In certain embodiments, the user interface 206 may include or cooperate with various features to allow a user to interact with the computing device 200 via graphical elements rendered on a display element (e.g., the display device 216). Accordingly, the user interface 206 may initiate the creation, maintenance, and presentation of a graphical user interface (GUI). In certain embodiments, the display device 216 implements touch-sensitive technology for purposes of interacting with the GUI. Thus, a user can manipulate the GUI by moving a cursor symbol rendered on the display device 216, or by physically interacting with the display device 216 itself for recognition and interpretation, via the user interface 206.

The plurality of sensors 208 is configured to obtain data associated with active use of the computing device 200, and may include, without limitation: touchscreen sensors, accelerometers, gyroscopes, or the like. Some embodiments of the computing device 200 may include one particular type of sensor, and some embodiments may include a combination of different types of sensors. Generally, the plurality of sensors 208 provides data indicating whether the computing device 200 is currently being used. Touchscreen sensors may provide output affirming that the user is currently making physical contact with the touchscreen (e.g., a user interface 206 and/or display device 216 of the computing device 200), indicating active use of the computing device. Accelerometers and/or gyroscopes may provide output affirming that the computing device 200 is in motion, indicating active use of the computing device 200.

The communication device 210 is suitably configured to communicate data between the computing device 200 and one or more remote servers and one or more avionics systems onboard an aircraft. The communication device 210 may transmit and receive communications over a wireless local area network (WLAN), the Internet, a satellite uplink/downlink, a cellular network, a broadband network, a wide area network, or the like. As described in more detail below, data received by the communication device 210 may include, without limitation: avionics systems data and aircraft parameters (e.g., a heading for the aircraft, aircraft speed, altitude, aircraft position, ascent rate, descent rate, a current flight plan, a position of air spaces around a current flight plan, and activity of the air spaces around a current flight plan), and other data compatible with the computing device 200. Data provided by the communication device 210 may include, without limitation, requests for avionics systems data, alerts and associated detail for display via an aircraft onboard display, and the like.

The FMS 212, as is generally known, is a specialized computer that automates a variety of in-flight tasks such as in-flight management of the flight plan. Using various sensors such as global positioning system (GPS), the FMS 212 determines the aircraft's position and guides the aircraft along its flight plan using its navigation database. From the cockpit, the FMS 212 is normally controlled through a visual display device such as a control display unit (CDU) which incorporates a small screen, a keyboard or a touchscreen. The FMS 212 displays the flight plan and other critical flight data to the aircrew during operation.

The FMS 212 may have a built-in electronic memory system that contains a navigation database. The navigation database contains elements used for constructing a flight plan. In some embodiments, the navigation database may be separate from the FMS 212 and located onboard the aircraft while in other embodiments the navigation database may be located on the ground and relevant data provided to the FMS 212 via a communications link with a ground station. The navigation database used by the FMS 212 may typically include: waypoints/intersections; airways; radio navigation aids/navigation beacons; airports; runway; standard instrument departure (SID) information; standard terminal arrival (STAR) information; holding patterns; and instrument approach procedures. Additionally, other waypoints may also be manually defined by pilots along the route.

The flight plan is generally determined on the ground before departure by either the pilot or a dispatcher for the owner of the aircraft. It may be manually entered into the FMS 212 or selected from a library of common routes. In other embodiments the flight plan may be loaded via a communications data link from an airline dispatch center. During preflight planning, additional relevant aircraft performance data may be entered including information such as: gross aircraft weight; fuel weight and the center of gravity of the aircraft. The aircrew may use the FMS 212 to modify the plight flight plan before takeoff or even while in flight for variety of reasons. Such changes may be entered via the CDU. Once in flight, the principal task of the FMS 212 is to accurately monitor the aircraft's position. This may use a GPS, a VHF omnidirectional range (VOR) system, or other similar sensor in order to determine and validate the aircraft's exact position. The FMS 212 constantly cross checks among various sensors to determine the aircraft's position with accuracy.

Additionally, the FMS 212 may be used to perform advanced vertical navigation (VNAV) functions. The purpose of VNAV is to predict and optimize the vertical path of the aircraft. The FMS provides guidance that includes control of the pitch axis and of the throttle of the aircraft. In order to accomplish these tasks, the FMS 212 has detailed flight and engine model data of the aircraft. Using this information, the FMS 212 may build a predicted vertical descent path for the aircraft. A correct and accurate implementation of VNAV has significant advantages in fuel savings and on-time efficiency.

The display device 216 is configured to display various icons, text, and/or graphical elements associated with alerts related to situations requiring user attention, wherein the situations are associated with a device or system that is separate and distinct from the computing device 200. In an exemplary embodiment, the display device 216 and the user interface 206 are communicatively coupled to the processor 202. The processor 202, the user interface 206, and the display device 216 are cooperatively configured to display, render, or otherwise convey one or more graphical representations or images associated with high-priority or critical flight situation alerts on the display device 216, as described in greater detail below. In an exemplary embodiment, the display device 216 is realized as an electronic display configured to graphically display critical flight situation alerts and associated detail, as described herein. In some embodiments, the computing device 200 is an integrated computer system onboard an aircraft, and the display device 216 is located within a cockpit of the aircraft and is thus implemented as an aircraft display. In other embodiments, the display device 216 is implemented as a display screen of a standalone, personal computing device (e.g., laptop computer, tablet computer). It will be appreciated that although the display device 216 may be implemented using a single display, certain embodiments may use additional displays (i.e., a plurality of displays) to accomplish the functionality of the display device 216 described herein.

Figure 3:
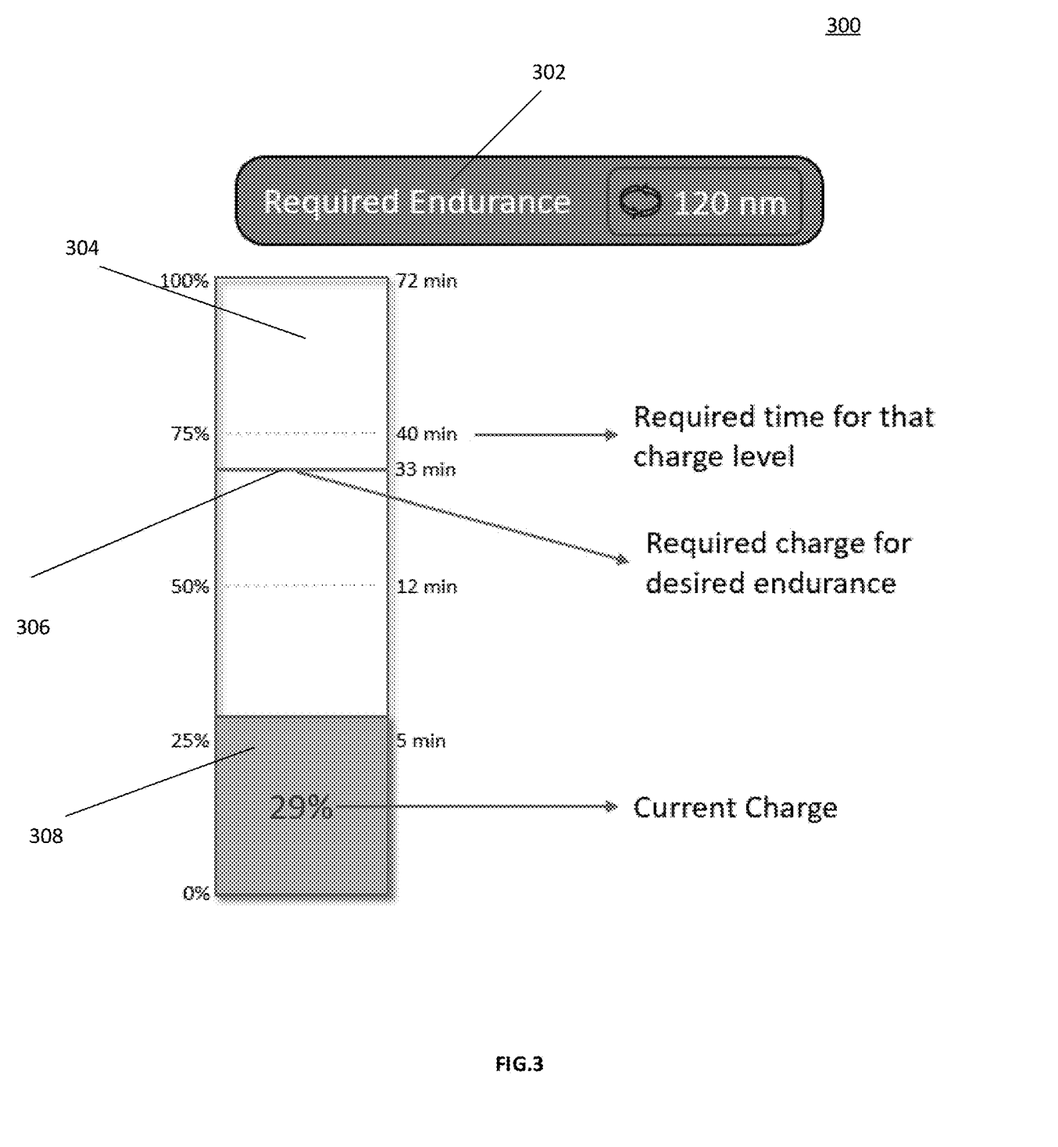
FIG. 3 shows a single battery status display in accordance with one embodiment.

Turning now to FIG. 3, a status display 300 for a single battery is shown in accordance with one embodiment. The display 300 corresponds to the display device 216 shown previously in FIG. 2. The display 300 shows a required endurance display 302 for the aircraft. The "required endurance" is a distance that is derived from the current flight plan that is typically stored in the FMS. In alternative embodiments, the required endurance distance may be manually entered by an aircrew member. The number shown (i.e., 120 NM) is the distance needed to be covered by the aircraft in an upcoming leg of the flight plan. In some embodiments, an additional buffer distance (e.g., an additional 10%) is added to the required endurance distance to allow the aircraft to divert to an alternative location if necessary.

The status of the battery is shown as a bar graph 304. The current charge level 308 of the battery is shown as a colored segment of the bar graph. In this example, the current charge level 308 is also indicated by a numerical percentage (e.g., 29%) shown on the bar graph 304. A separate line on the bar graph indicates the required charge level 306 for the desired endurance 302 of the battery. Also shown on the sides of the bar graph are a percentage scale reflecting the charge level of the battery and a required recharge time to reach the corresponding percentage charge level. In this example, the required recharge time is shown in minutes.

The required charge level 306 is determined based on the required endurance 302 for the battery of the aircraft. In this example, the required recharge time (e.g., 33 minutes) indicates the amount of time that the battery must spend recharging from the current charge level of 29% to reach the required charge level to travel 120 nautical miles. This data ensures that the vehicle doesn't have to spend any more time on the ground recharging the battery than necessary. This has the advantage of significantly reducing the overall aircraft on the ground (AOG) time due to recharging.

Figure 4:
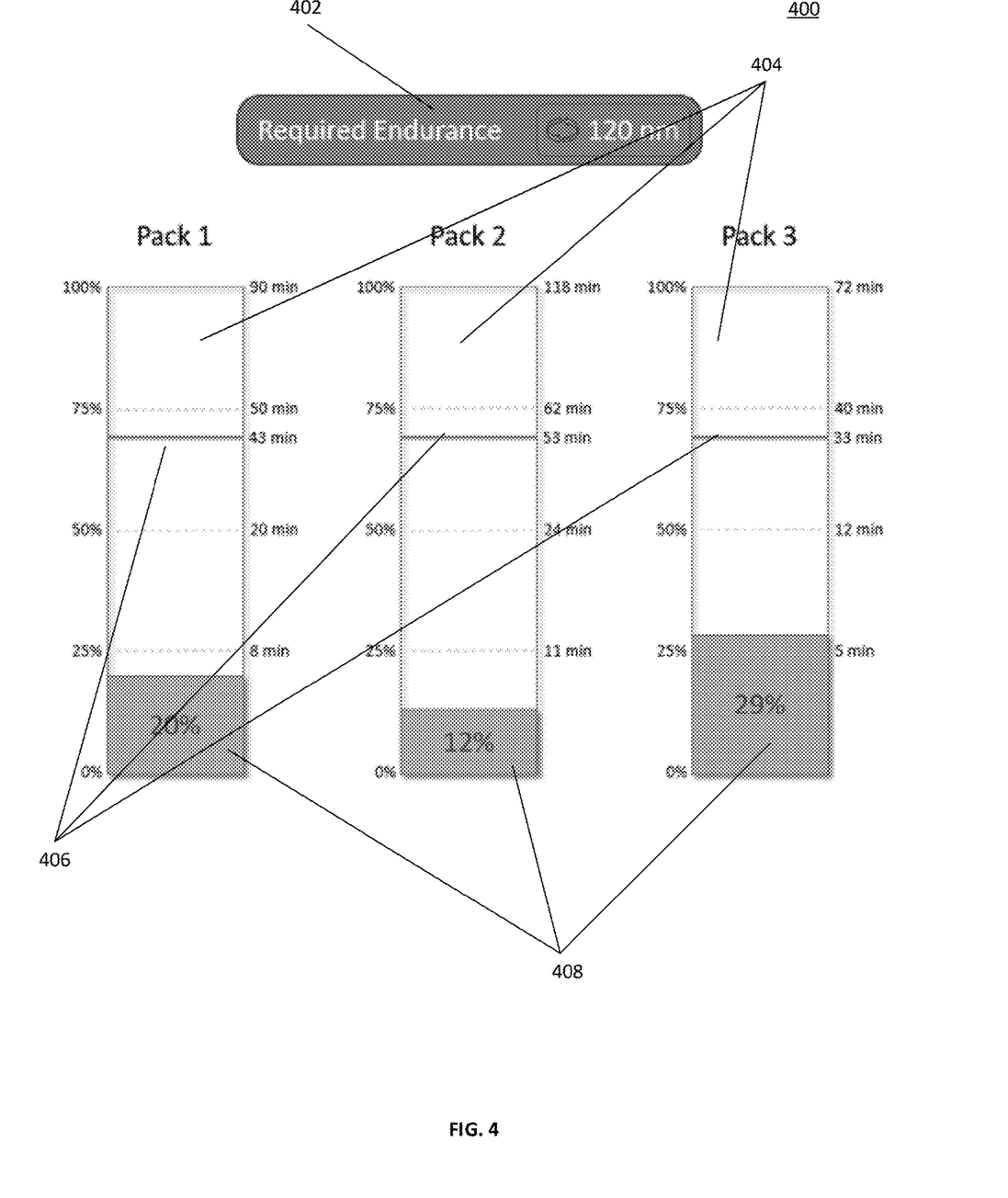
FIG. 4 shows a multi-battery status display in accordance with one embodiment.

Turning now to FIG. 4, a status display 400 for multi-battery packs is shown in accordance with one embodiment. In this example, the aircraft is powered by three separate battery packs instead of a single battery as shown previously in FIG. 3. As discussed previously in reference to FIG. 3, a required endurance display 402 is shown for the aircraft. Additionally, a separate battery status bar graph display 404 is shown for each battery pack. These displays correspond to the single bar graph display 304 as discussed and shown previously in FIG. 3. Specifically, each bar graph display 404 has a current charge level 408 and a required charge level 406 to meet the required endurance 402. However, each battery pack shown in this example has different characteristics such as the current charge levels (i.e., 20%, 12% and 29%) and required recharge times (i.e., 43 min, 53 min and 33 min). These characteristics reflect the requirements of each individual battery pack. The individual battery packs will vary in performance characteristics based on age, condition, maintenance status, battery type, etc. For example, the recharge time for each individual battery pack is calculated based on, historical recharge times and data of the battery, the age of the battery and the temperature of the battery while recharging. In some embodiments, the characteristics and data regarding each battery may be saved for later analysis of the battery performance characteristics. The analysis may be used in predicting necessary maintenance and/or replacement of a battery.

Figure 5A:
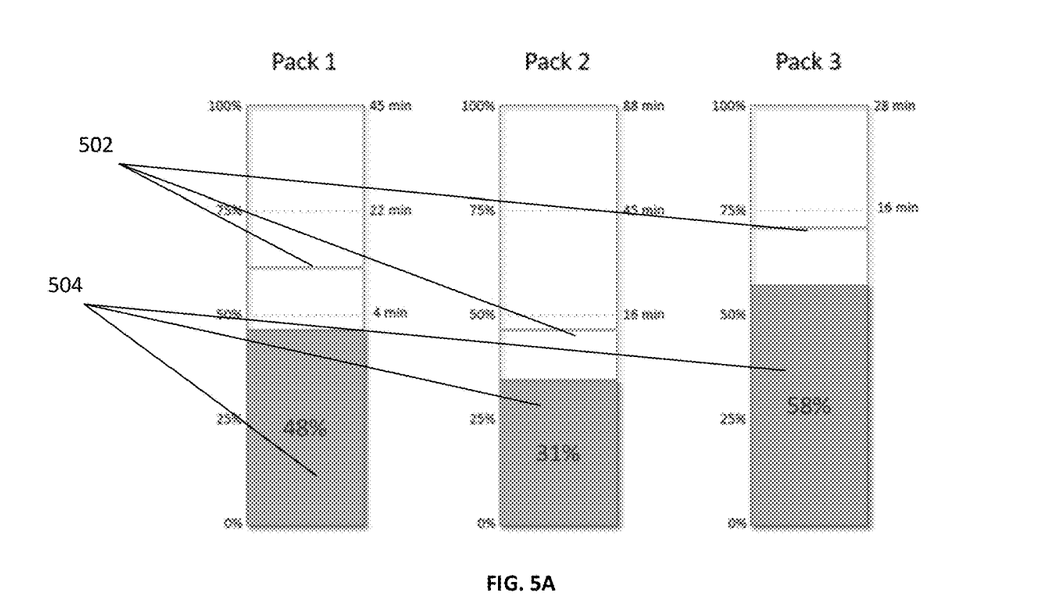
FIGS. 5A and 5B show multi-battery status displays while re-charging in accordance with one embodiment.
Figure 5B:
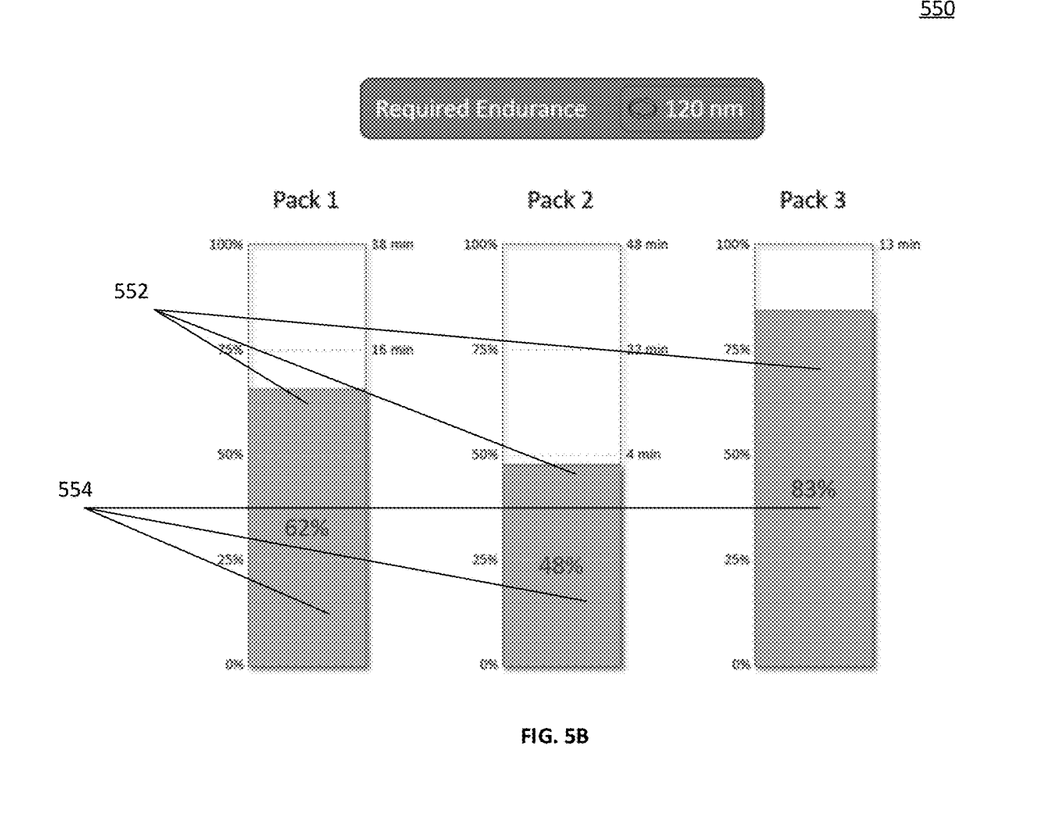

Turning now to FIGS. 5A and 5B, battery status displays 500 and 550 are shown for multi-battery packs while recharging in accordance with one embodiment. In this example, separate status bar graph displays 504 and 554 are shown that correspond to the previously shown and discussed bar graph displays 404 in FIG. 4. In this example, the bar graphs 504 are shown while recharging. The current charge levels for each graph (i.e., 48%, 31% and 58%) have increased from the previous values shown in FIG. 4. Additionally, the required charge level for the desired endurance of each battery pack has fluctuated from the previous levels shown in FIG. 4. This reflects the difference recharge rate for each battery pack. For systems with multiple battery packs, it's possible that each battery pack recharges at a different rate. This may be due to differing age, make, capacity, model or type of the battery pack. Some batteries could recharge faster than others based on these characteristics. Also, the discharge rate of each battery pack could differ for many of the same reasons. This may also result in a difference in a required charge level 502 for each battery pack. FIG. 5B shows the bar graph displays 554 of the battery packs once each battery pack has achieved or surpassed its required charge level 552. Some of the battery packs (i.e., Pack 1 and Pack 3) have a charge level that exceeds their required charge level 552 because these packs were still charging while battery Pack 2 was still recharging until it reached its required charge level.

Figure 6:
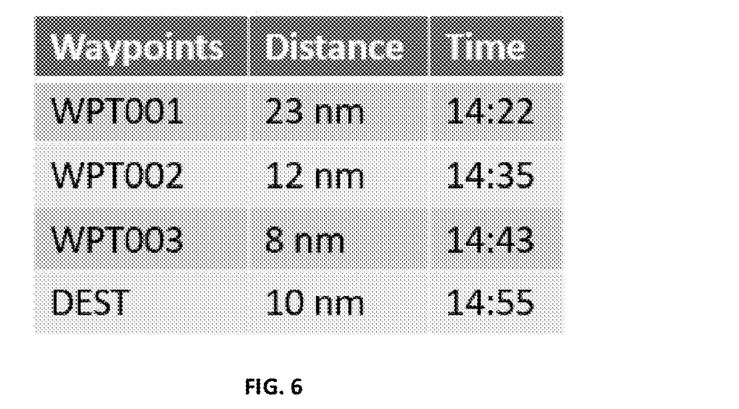
FIG. 6 shows a table listing waypoints, distances and times for an aircraft flight plan in accordance with one embodiment.
Figure 7:
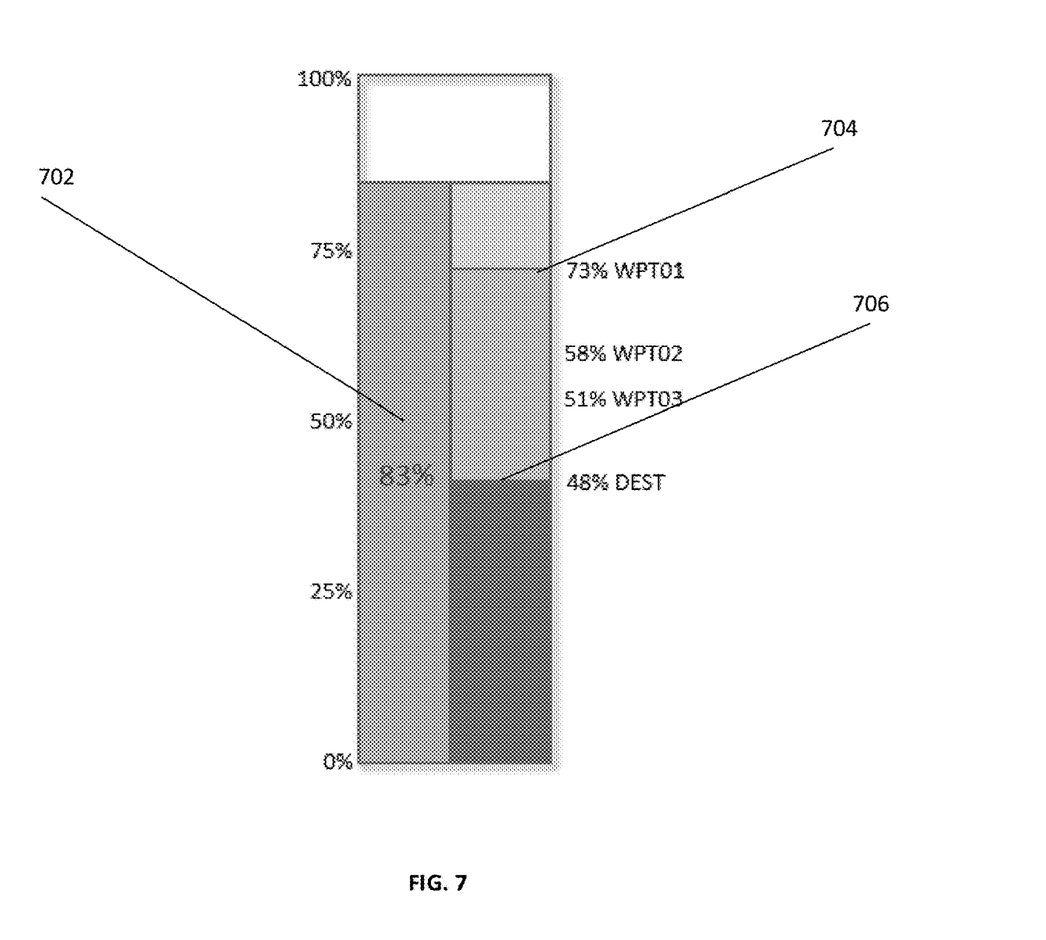
FIG. 7 shows a single battery status display with break outs for waypoints and a destination in accordance with one embodiment.

Turning now to FIG. 6, a table 600 listing waypoints, distances and times for an aircraft flight plan is shown in accordance with one embodiment. These waypoints (i.e., WPT01, WPT02, and WPT03) are intermediate points along the way to a final destination (i.e., DEST) for the aircraft. Also listed in the chart are corresponding distances (in NM) to each waypoint and the time-of-flight (in Min:Sec) required for the aircraft. This data is used to provide additional information as a reference to the battery status display in one embodiment. FIG. 7 shows a single battery status display 700 with breakouts for waypoints and a destination in accordance with one embodiment. In this example, the battery status display bar graph 700 corresponds to the previously shown and discussed bar graph displays 404 in FIG. 4. In addition to the current charge level of the battery 702, a corresponding parallel bar graph display shows the corresponding battery charge levels that are remaining upon arrival at the each waypoint 704 and the battery charge level that remains upon arrival at the destination 706 by the aircraft (i.e., 73% for WPT01, 58% for WPT02, 51% for WPT03 and 48% for DEST). This provides additional information for the aircrew to assist in analyzing battery performance data.

Figure 8A:
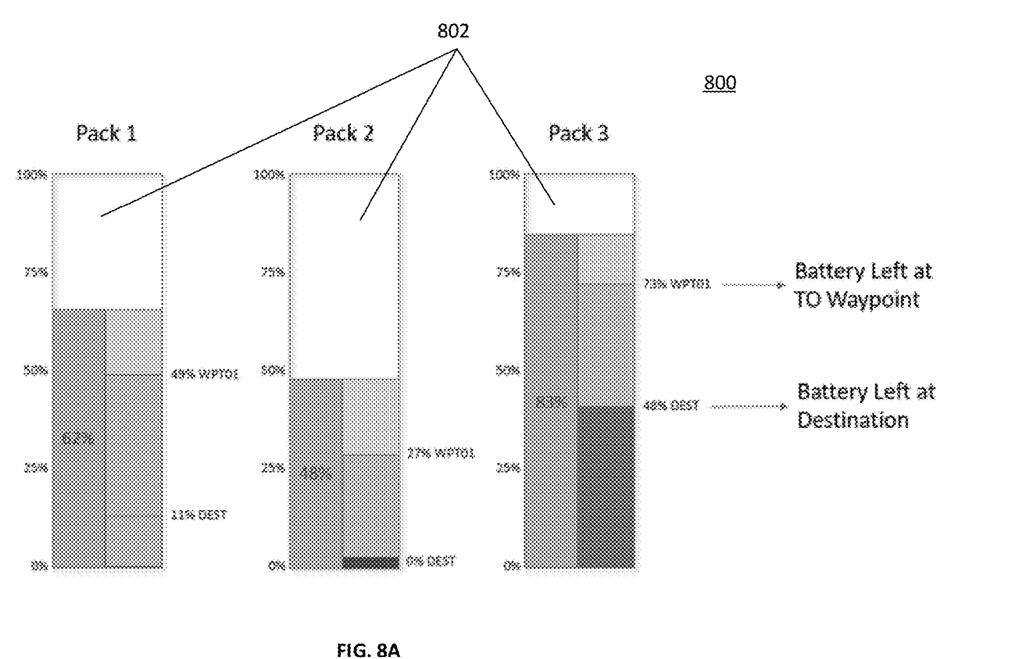
FIGS. 8A and 8B show multi-battery status displays with break outs for waypoints and a destination in accordance with one embodiment.
Figure 8B:
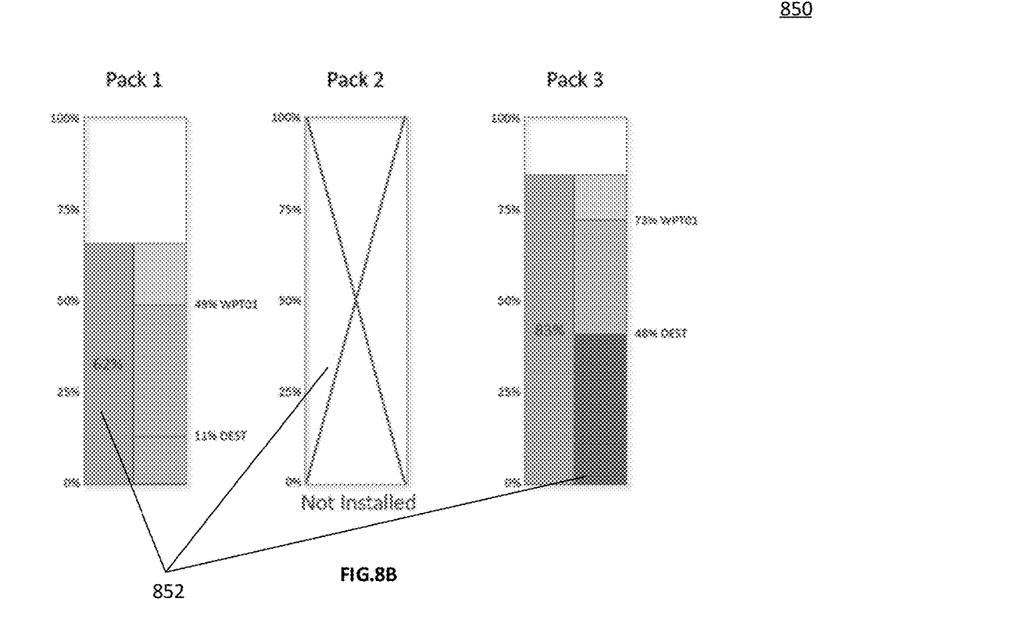

Turning now to FIGS. 8A and 8B, multi-battery pack status displays 800 and 850 with breakout for waypoints and a destination are shown in accordance with one embodiment. These examples of status displays correspond to the status display bar graph 702 for a battery pack shown and discussed previously in FIG. 7. These examples show additional features of the status display bar graphs used alternative embodiments. Specifically, FIG. 8A shows a caution status for the display bar graph 802 of Battery Pack 1. In this example, the battery pack will only have an 11% charge remaining once the aircraft reaches its destination. Also, the display bar graph 802 of Battery Pack 2 shows a warning that this battery will have 0% charge when the aircraft reaches its destination. Additionally, FIG. 8B shows a display bar graph 852 for battery pack to that shows a warning which indicates that Battery Pack 2 is not installed. In alternative embodiments, the display 852 could also indicate that the battery is malfunctioning, improperly installed, or an improper type of battery, etc.

Figure 9:
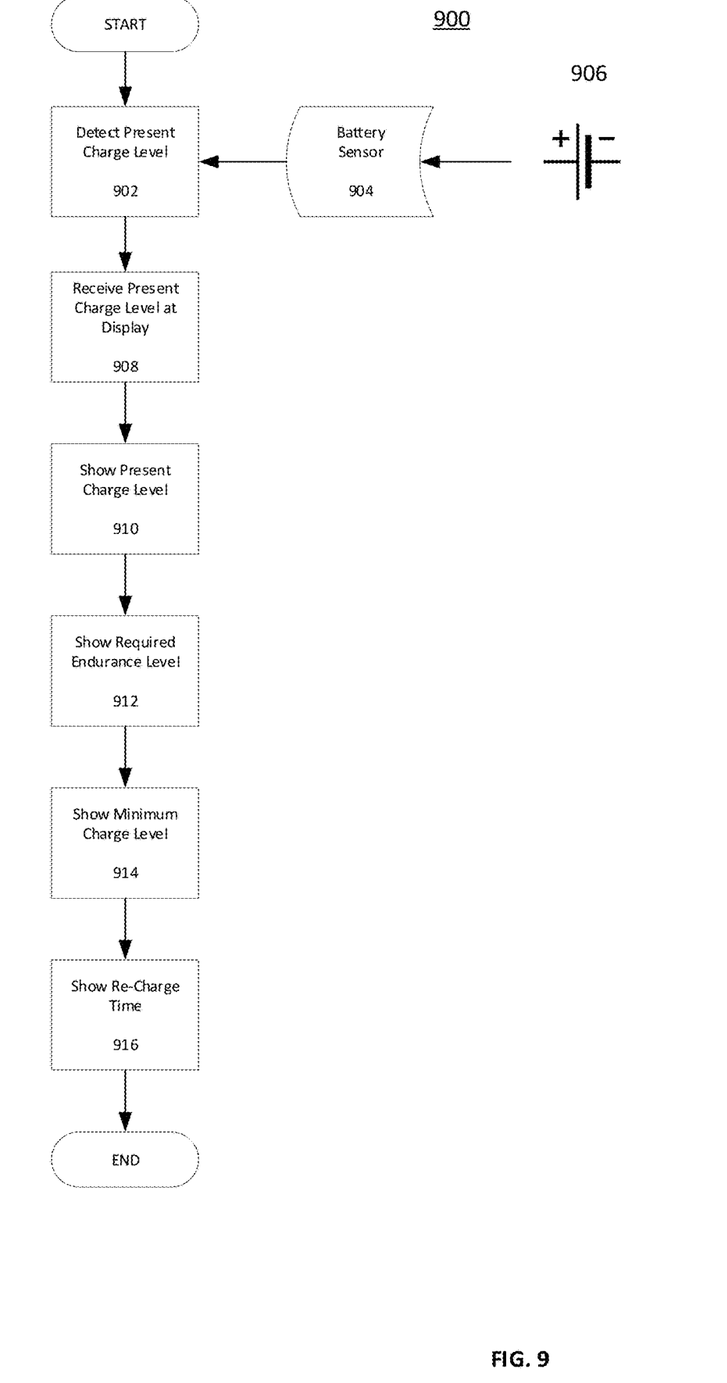
FIG. 9 shows a flowchart for a method of showing a status for a rechargeable battery system for an aircraft in accordance with one embodiment.

Turning now to FIG. 9, a flowchart 900 is shown for a method of showing a status for rechargeable battery system for an aircraft in accordance with one embodiment. In this method, a present charge level is detected 902 in a rechargeable battery 906 with a battery sensor 904. The present charge level of the battery is received at a display 908. The display shows: the present charge level 910; the required endurance level for the battery based on a planned operational parameter for the vehicle 912; a minimum charge level in the battery that meets the required endurance level 914; and an amount of recharge time for the battery to achieve the minimum charge level 916.

In this example, the displayed required charge level of the battery is continuously recalculated and dynamically updated during the operation of the vehicle. The continuous recalculation may change the required endurance level based on the present discharge rate of the battery. For example, an increased rate of speed for the vehicle may result in increased discharge rate for the battery. This increased discharge rate will typically increase the minimum charge level of the battery to meet the required endurance level. The system may also provide a warning if the discharge rate of the battery is too great and the battery will reach a 0% charge prior to reaching its destination. In alternative embodiments, an alert message for the operational status of the battery may also be shown on the display. The alert message may include recharging status, the hours until maintenance is required for the battery, the hours until a replacement is required for the battery, hours until a predicted failure of the battery, etc.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

The following description refers to elements or nodes or features being "connected" or "coupled" together. As used herein, unless expressly stated otherwise, "coupled" means that one element/node/feature is directly or indirectly joined to (or directly or indirectly communicates with) another element/node/feature, and not necessarily mechanically. Likewise, unless expressly stated otherwise, "connected" means that one element/node/feature is directly joined to (or directly communicates with) another element/node/feature, and not necessarily mechanically. Thus, additional intervening elements, devices, features, or components may be present in an embodiment of the depicted subject matter.

In addition, certain terminology may also be used in the following description for the purpose of reference only, and thus are not intended to be limiting. For example, terms such as "upper", "lower", "above", and "below" refer to directions in the drawings to which reference is made. Terms such as "front", "back", "rear", "side", "outboard", and "inboard" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second", and other such numerical terms referring to structures do not imply a sequence or order unless clearly indicated by the context.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set or may be distributed over different locations including over different storage devices, and may exist, at least partially, merely as electronic signals on a system or network.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A system for displaying operating data for a re-chargeable battery for an electric vehicle, comprising:
   the re-chargeable battery for powering components of the electric vehicle;
   a sensor for the re-chargeable battery that detects a present level of charge in the re-chargeable battery; and
   a display that receives the present level of charge of the re-chargeable battery from the sensor, and shows,
      the present level of charge in the re-chargeable battery, a required endurance level for the re-chargeable battery, where the required level of endurance is based on a planned operational parameter for the electric vehicle, where the planned operational parameter for the vehicle is automatically determined from a flight plan for an aircraft by a flight management system (FMS), a minimum charge level in the re-chargeable battery that meets the required endurance level of the re-chargeable battery, and an amount of re-charge time for the re-chargeable battery to achieve the minimum charge level in the re-chargeable battery.

2. The system of claim 1, where the electric vehicle is an aerial vehicle.

3. The system of claim 1, where the planned operational parameter for the electric vehicle is manually entered by an operator of the electric vehicle.

4. The system of claim 1, where the minimum charge level includes a buffer to allow for an increased required endurance level of the re-chargeable battery during operations.

5. The system of claim 1, where the re-charge time for the re-chargeable battery is calculated based on historical recharge data of the re-chargeable battery.

6. The system of claim 1, where the re-charge time for the re-chargeable battery is calculated based on an age of the re-chargeable battery.

7. The system of claim 1, where the re-charge time for the re-chargeable battery is calculated based on a temperature of the re-chargeable battery.

8. A system for displaying operating data for a re-chargeable multi-battery pack for an electric vehicle, comprising:

a re-chargeable multi-battery pack for powering components of the electric vehicle, where the re-chargeable multi-battery pack comprises a plurality of individual re-chargeable batteries;

a sensor that detects a present level of charge in each re-chargeable battery; and a display that receives the present level of charge of each re-chargeable battery from the sensor, and shows, the present level of charge in each re-chargeable battery, a required endurance level for the re-chargeable multi-battery pack, where the required level of endurance is based on a planned operational parameter for the electric vehicle, where the planned operational parameter for the vehicle is automatically determined from a flight plan for an aircraft by a flight management system (FMS), a minimum total charge level for the re-chargeable multi-battery pack that meets the required endurance level of the re-chargeable battery, and an amount of re-charge time for each re-chargeable battery to achieve the minimum total charge level for the re-chargeable multi-battery pack.

9. The system of claim 8, where the display further shows an operational status of each re-chargeable battery in the re-chargeable multi-battery pack.

10. The system of claim 9, where the operational status of each re-chargeable battery comprises an uninstalled re-chargeable battery.

11. The system of claim 9, where the operational status of each re-chargeable battery comprises a completely discharged re-chargeable battery.

12. A method for displaying operating data for a re-chargeable battery for an electric vehicle, comprising:

detecting a present level of charge in the re-chargeable battery with a sensor, where the re-chargeable battery powers components of the electric vehicle;

receiving the electric vehicle's location from a global positioning system (GPS) sensor;

computing the electric vehicle's position along a flight plan using the electric vehicle's location;

receiving the present level of charge of the re-chargeable battery from the sensor with a display; and showing on the display, the present level of charge in the re-chargeable battery, a required endurance level for the re-chargeable battery relative to the electric vehicle's position along the flight plan, where the required level of endurance is based on a planned operational parameter for the electric vehicle, where the planned operational parameter for the vehicle is automatically determined from the flight plan for an aircraft by a flight management system (FMS), a minimum charge level in the re-chargeable battery that meets the required endurance level of the re-chargeable battery, and an amount of re-charge time for the re-chargeable battery to achieve the minimum charge level in the re-chargeable battery.

13. The method of claim 12, where the displayed required endurance level for the re-chargeable battery is continuously re-calculated during operation of the electric vehicle.

14. The method of claim 13, where the required endurance level for the re-chargeable battery is re-calculated based on a present discharge rate of the re-chargeable battery.

15. The method of claim 12, where the display further shows, an alert message for the operational status of the re-chargeable battery.

16. The method of claim 15, where the alert message comprises hours until maintenance is required for the re-chargeable battery.

17. The method of claim 15, where the alert message comprises hours until a replacement is required for the re-chargeable battery.

18. The method of claim 15, where the alert message comprises hours until a failure warning for the re-chargeable battery.

* * * * *